(12) United States Patent
Suter

(10) Patent No.: US 8,356,700 B2
(45) Date of Patent: Jan. 22, 2013

(54) ELECTRO-MECHANICAL ACTUATOR EQUIPPED WITH A MECHANICAL BRAKE OF COIL SPRING TYPE

(75) Inventor: Ernst Suter, Kolliken (CH)

(73) Assignee: Areva T&O AG, Oberentfelden (CH)

( * ) Notice: Subject to any disclaimer, the term of this patent is extended or adjusted under 35 U.S.C. 154(b) by 825 days.

(21) Appl. No.: 12/260,960

(22) Filed: Oct. 29, 2008

(65) Prior Publication Data

US 2009/0107268 A1 Apr. 30, 2009

(30) Foreign Application Priority Data

Oct. 29, 2007 (FR) ..................................... 07 58659

(51) Int. Cl.
*B65H 59/10* (2006.01)
(52) U.S. Cl. ....................................................... 188/67
(58) Field of Classification Search .................... 188/67, 188/166; 310/92, 93, 99, 75 R, 77, 83; 200/17 R, 200/400, 401; 218/84, 154; 335/74
See application file for complete search history.

(56) References Cited

U.S. PATENT DOCUMENTS

| 3,405,791 | A | | 10/1968 | Kaplan |
| 3,687,249 | A | * | 8/1972 | Priest et al. .................... 192/215 |
| 7,932,794 | B2 | * | 4/2011 | Suter ............................... 335/68 |
| 2007/0245844 | A1 | * | 10/2007 | Yokoyama et al. ............. 74/470 |

FOREIGN PATENT DOCUMENTS

| CH | 424 932 A | 11/1966 |
| DE | 896 742 C | 11/1953 |
| DE | 16 90 093 B1 | 10/1971 |
| DE | 88 00 180 U1 | 2/1988 |
| EP | 0 455 039 A | 11/1991 |

OTHER PUBLICATIONS

French Preliminary Search Report, FR 07 58659, mailed Jun. 13, 2008.

* cited by examiner

*Primary Examiner* — Bradley King
*Assistant Examiner* — Nicholas J Lane
(74) *Attorney, Agent, or Firm* — Nixon Peabody LLP

(57) ABSTRACT

An actuator having a frame which is fixed to an electric motor; a gear drive for transmitting motion from the motor to a drive shaft between two predetermined positions, and a brake consisting of a coil spring, having, when relaxed, an inside diameter that is smaller than the outside diameter of a support shaft that is fixed relative to the gear drive, and around which the spring is coiled, each of the two free ends of the spring being arranged in a respective slot, formed in the frame.

3 Claims, 6 Drawing Sheets

ELECTRO-MECHANICAL ACTUATOR EQUIPPED WITH A MECHANICAL BRAKE OF COIL SPRING TYPE

CROSS REFERENCE TO RELATED APPLICATIONS OR PRIORITY CLAIM

This application claims priority to French Patent Application No. 07 58659, filed Oct. 29, 2007.

TECHNICAL FIELD AND PRIOR ART

This invention relates to the field of actuators, of the type having an electric motor and a gear drive for transmission of motion from the motor to a drive shaft between two predetermined positions.

It is applicable to actuators for interrupters such as disconnectors, and more particularly to medium or high voltage disconnectors.

In medium or high voltage disconnectors, it is known to use, by way of an actuator, an electric motor, a gear drive for transmitting the motion from the motor to a drive shaft between two predetermined positions corresponding to the open and closed positions of the movable main contact of the interrupter, and finally at least one first auxiliary interrupter for breaking the power supply to the motor once the main contact has reached its closed or open position.

It is also known to synchronize the deflection of the movable contact of the first auxiliary interrupter with the closed position of the movable main contact of the disconnector.

Finally, it is known to synchronize deflection of the movable contact of the first auxiliary interrupter with the deflection of a movable contact of a second auxiliary interrupter that serves to signal the state of switching (I/O) of the disconnector.

Accordingly the document CH 424 932 teaches an actuator for an interrupter that comprises an electric motor, a toothed wheel 11 coupled with the output shaft of the motor and fixed relative to a worm or leadscrew drive system 5, 6 having a cursor nut 6, which, through a forked lever 7, causes rotation of a main shaft that is coupled to a contact of the interrupter, which may for example be a disconnector. The forked lever 7 is so designed as to enable the rider or cursor nut 6 to move freely after the end of the movement of the main shaft. At the end of this free stroke, the power supply to the motor is cut off, and the motor and the cursor nut 6 of the leadscrew system stop. A stack of Belleville rings 20, constituting a spring, damps out the braking action of the cursor nut 6. The leadscrew 5 has a relief which releases the nut 6 at the end of the operation. The Belleville rings 20 cause the nut 6 to be re-engaged on the leadscrew 5 during rotation in the opposite sense. The engagement of the nut 6 thereby made gives rise to substantial forces in the worm shaft (or leadscrew) 5 of the leadscrew system, and in the chassis 4. In addition, the relief zone of the nut 6 and the leadscrew are subject to a high degree of wear. This then makes it necessary to re-dimension the mechanism in relation to its primary function, namely that of causing the main shaft to rotate. The said document is not concerned with how the auxiliary interrupter contacts are controlled over a long stroke of movement.

The document DE 1 690 093 teaches an improvement on the actuator described in Patent CH 424 932, which improvement consists in the provision of an additional interrupter for operating an electric brake of the motor during the free travel (i.e. the last part of the movement of the cursor 6). The use of such an electric brake for the motor is not an expedient that is optimal in terms of cost. It is necessary to provide a remedy for the stresses set up by high short circuit currents.

The document EP 0 455 039 teaches an actuator for an interrupter that includes a rotatable shaft 1 that displaces a cursor nut 2 with a finger 5 lodged in a slot 6, the shape of which is adapted to cause rotation of a main shaft 4, which is fixed to a contact of the interrupter. An indicating device 12 is provided, which has a slot 13 and which is controlled by the finger 5 in displacement so that it pivots. The indicating device 12 may have a toothed section 15 for rotating a pinion 16 and its shaft 17, to which it is fixed. The rotation of the shaft 17 actuates the auxiliary interrupter so as to cut off the power supply to the motor (not shown) that rotates the shaft 1. The pivoting motion of the indicating device 12 is not long enough. The use of a pinion such as the pinion 17, and use of the balancer 3, is not the best solution in terms of cost. Moreover, the said document does not propose any way of effecting braking at the end of the movement.

According to that document, there is, therefore, a risk of the movement being stopped by the finger 14 being blocked at the end of the slot 13, which can generate high forces. In other words, such a slot 13, designed to have portions 13a, 13b that are short for the starting and stopping stages, is likely to lead to problems for interrupter actuators of low friction and/or high inertia.

The patent U.S. Pat. No. 3,405,791 discloses a mechanical brake constituted by a spring 30, 30a, 30b 30c, 30d coiled around a shaft 26, 26a, 26b, 26c, 26d. The assemblies with the different springs 30, 30c, 30d foreseen in that patent are complex and do not allow to obtain a brake that is not self-blocking in the two senses of rotation of the shaft 26, 26a, 26b, 26c, 26d around which they are coiled individually.

The object of the invention is to propose a new type of electro-mechanical actuator, in particular for high or medium voltage disconnectors, which compensates for the disadvantages of the existing actuators, in particular by effective braking of movement at the end of the stroke and which does allow a not self-blocking brake in the two senses of rotation of the shaft.

Another object of the invention is to propose an actuator with a brake that delivers braking force that is stable and independent of the constraints of the outside environment (dust, pollution, grease, cold, ice . . . ), and that does not require maintenance.

DISCLOSURE OF THE INVENTION

To this end, the invention provides an actuator of an electromagnetic type comprising:

a frame;

an electric motor fixed to the said frame;

a gear drive for transmitting motion from the motor to a drive shaft between two predetermined positions, the said gear drive and drive shaft also being fixed to the frame; and a brake consisting of a coil spring, having, when relaxed, an inside diameter that is smaller than the outside diameter of a support shaft that is fixed relative to the gear drive, and around which the spring is coiled, each of the two free ends of the spring being arranged in a respective slot formed in the said frame transversely to the support shaft, the arrangement being such that only one end comes into transverse engagement against its slot, while the other end is free in its slot in the transverse direction, whereby to generate a braking force limited to the opening force of the spring.

Thus, according to the invention, the two ends of the coil spring are each lodged in a slot of the frame and the two slots are arranged relative to one another in such a manner that one or the other of the ends of the spring comes into transversal abutment with its corresponding slot, thereby balancing the braking force and the forces for opening the turns of the spring.

Compared with the high-voltage disconnector actuators of the prior art, the actuator of the invention thus proposes an efficient mechanical brake at the end of the stroke regardless of the inertia and/or of the friction intrinsic to the actuator.

According to an embodiment of the invention, the brake is controlled as a function of the position of the drive shaft in such a way as to be:

activated after the drive shaft has reached one of the said predetermined positions, and after the power supply to the motor has been broken; and released when the drive shaft is in a position between the two said predetermined positions.

Advantageously, the mechanical brake is actuated by transverse displacement in one direction of a member which is itself displaced by the gear drive so as to put the said one end into transverse engagement against its slot while leaving the other end free in its slot in the transverse direction.

In a preferred embodiment of the invention, the mechanical brake is disabled between the two said predetermined positions of the drive shaft, the brake being disabled by transverse displacement of the said member in a direction opposite to the said one direction, so as to exert a thrust transversely on at least the free end, whereby to put it too into transverse engagement against its slot by fully opening the turns of the spring around the support shaft.

Thus, the mechanical brake of the invention is, so to speak, self-actuated and self-released since it is actuated and released only by the movement of the gear drive, i.e. without intervention external to the actuator.

DETAILED DESCRIPTION OF PARTICULAR EMBODIMENTS

Figure 1:
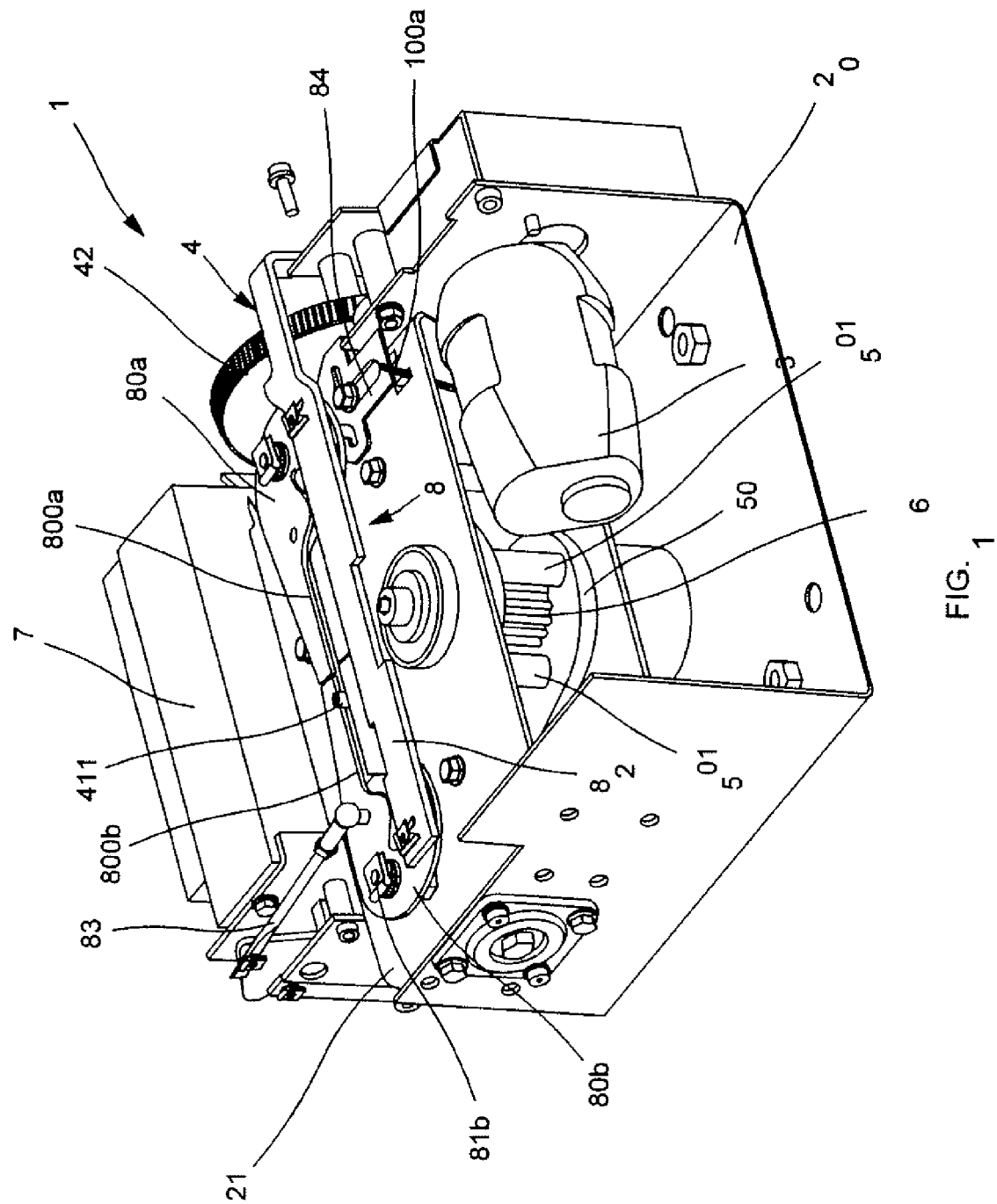
FIG. 1 is a perspective view of an actuator 1 according to the invention.

The actuator 1 shown is an actuator for a high voltage grounding disconnector.

The actuator 1 firstly comprises a body frame 2 that includes at least one base 20 and a main support 21, which are preferably, and to advantage, fabricated from bended metal sheet. An electric motor 3 and a gear drive 4, parallel to each other, are fixed to the base 20. A drive shaft 6, extending at a right angle to the electric motor 3, is rotatably mounted in the main support 21 and base 20.

Figure 2:
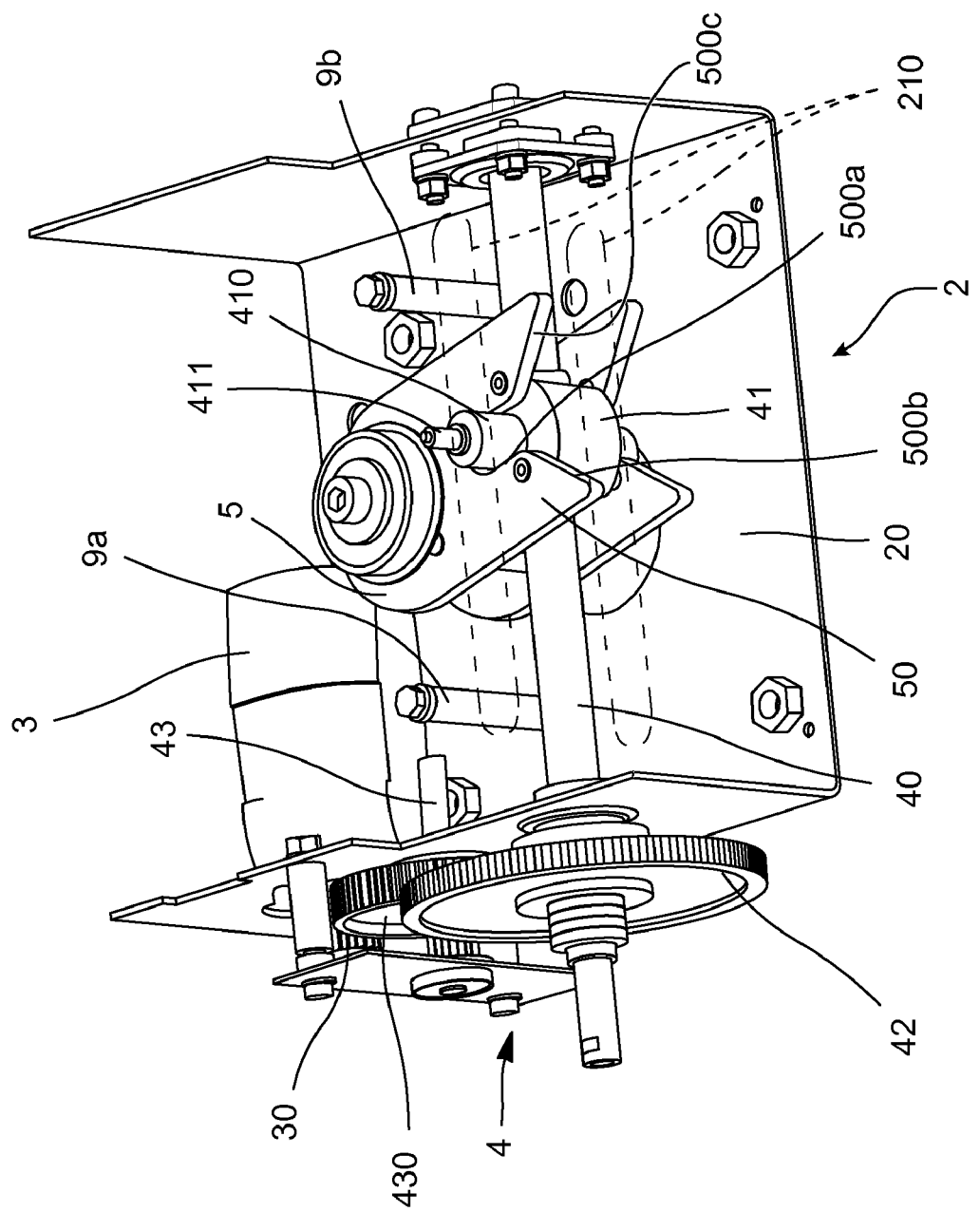
FIG. 2 is a perspective view of the actuator shown in FIG. 1, but with the auxiliary interrupter omitted, as are part of the body frame and the transmission means.

The gear drive 4 comprises a motor 3 with an output shaft 30, intermediate toothed wheels, and a toothed wheel 42. The toothed wheel 42 is fixed to a leadscrew or worm shaft 40 that is in threaded engagement with a rider nut 41 having a guide and drive finger 410 and a cursor spindle 411 (see FIG. 2).

A lever 5 having a fork 50 is fixed on the drive shaft 6. This shaft extends at a right angle to the worm shaft 40. The lever is so positioned that the guide finger 410 lies in the fork 50 between two predetermined positions on the worm shaft 40, so as to put the drive shaft 6 into rotation between two predetermined positions. In other words, the lever 5, with its fork 50, is set in rotation by the guide finger 410, or, in cooperation with the cylinders 9a and 9b, is blocked in one of the two said predetermined positions. The lever 5, with its fork 50, is fixed to the drive shaft 6, with which the movable main contact of the grounding disconnector (not shown) is coupled.

In one advantageous embodiment, the toothed wheel 42 is equipped with a torque limiting device (not shown), which limits the torque transmitted from the motor 3 to the drive shaft 6. This ensures that the position of the lever 5 with its fork 50, and the position of the cursor 411 connected to the control, indication and signaling means, always corresponds to that of the main contact of the disconnector, even in the event of a jam.

In an advantageous embodiment of the invention, the support shaft 43, fixed to the toothed wheel 430, is equipped with a mechanical brake 11, which consists of a coil spring with turns 110, as described below.

In accordance with the invention, the actuator 1 further includes a first auxiliary interrupter 7 for breaking the power supply to the electric motor when the cursor 411 completes its movement. For this purpose, transmission means 8 are provided for transmitting the movement of the cursor 411, in the final part of its stroke, to the first auxiliary interrupter 7. The transmission means 8 comprise a pair of control levers 80a and 80b which are coupled together, with one of them, namely the lever 80a, coupled to the movable contact of the first auxiliary interrupter 7. Each of the levers 80a and 80b is pivotable about a pivot pin 81a, 81b respectively, which are orthogonal to the worm shaft 40, and each of the said levers also has a guide edge 800a, 801a, 802a and 800b, 801b and 802b, each of which is adapted to receive the cursor 411 in sliding engagement regardless of its position on the worm shaft 40.

Each of these guide edges consists of a straight first portion 800a, 800b, a curved portion 801a, 801b, continuous with its straight portion 800a, 800b, and such that, when the cursor 411 is between its two positions, it slides in succession on the portions 800b, 800a that face each other and are aligned in the axis of the worm shaft, and then on one of the curved portions 801a, 801b of one of the guide edges.

The sliding movement of the cursor 411 on the curved portion 801a or 801b causes the corresponding control lever 80a or 80b to pivot (i.e. to swing pivotally), and at the same time, by means of a first coupling bar 82, it causes pivoting movement of the other lever 80b or 80a, and, by means of a second coupling bar 83, it also causes displacement of the movable contact of the auxiliary interrupter 7.

According to an advantageous variant, two cylinders 9a and 9b extend parallel to the drive shaft 6, and are positioned at a distance such that each of them acts as an end stop for the lever 5, with its fork 50, in a respective one of the two predetermined positions of the drive shaft 6.

The two control levers 80a and 80b are preferably identical with each other.

In the embodiment shown, the actuator 1 includes a second auxiliary interrupter 10, a movable contact of which is coupled to the movable contact of the first auxiliary interrupter 7 through a third coupling bar 100, in such a way that the displacement of the auxiliary interrupter 7 causes simultaneous displacement of the other auxiliary interrupter.

The position of the cursor 411 is detected by the two control levers 80a and 80b arranged in parallel above the worm shaft 40. Each control lever 80a, 80b is adapted to pivot about its pivot pin 81a, 81b, these pins being orthogonal to the worm shaft 40 and arranged on either side of the actuator 1. The first coupling bar 82, which couples the two levers 80a and 80b together, allows them to pivot in the same direction simultaneously.

The cursor 411, engaged on the guide edges 800a, 801a, 802a, 800b, 801b and 802b (in forced guiding) thus causes pivoting movement of the levers 80a and 80b as a function of its position on the worm shaft 40.

As shown, the lever 5, with its fork 50, is advantageously made from two identical metal plates 500, which are arranged parallel to each other and fixed to each other by means of several spacer bars 501, these plates being rigidly secured on the drive shaft 6. The distance between the two metal plates 500 is slightly greater than the height of the rider nut 41. Each plate 500 has a straight slot 500a which is continuous with inclined edges 500b and 500c. The width of the slot 500a is slightly greater than the diameter of the guide finger 410.

The rotational movement of the worm shaft 40 is converted into straight line (translational) movement of the rider nut 41 and guide fingers 410, the guide fingers being guided by the grooves 210 (parallel to the worm shaft 40), which are formed in the base 20 and support 21. The slot 500a converts the straight line movement of the nut 41, by means of the finger 410, into rotation of the drive shaft 6. The inclined edges 500b and 500c interrupt the transmission of the movement if one of the predetermined positions has been reached, and, in cooperation with the cylinders 9a and 9b, they hold the drive shaft 6 in that position.

Depending on the stage of operation of the actuator 1, the lever 5 is set in rotation by the guide fingers 410, or held against movement, by one of the end stops 9a or 9b at one of its ends, and by the guide fingers 410 interacting with the inclined edges 500b and 500c at its other end. The angle of rotation of the lever 5, with its fork 50, depends on the length and radial position of the straight slots 500a relative to the worm shaft 40. In the version shown, this angle is 90°.

The stages in the operation of the actuator 1 and its associated disconnector may be identified as follows:

Stage 1: End of the open position "O" (shown in FIG. 3A);

Stage 2: Start-up stage, i.e. the start of the movement with the motor 3 in rotation and the drive shaft 6 in opening position "O" (as shown in FIG. 3B);

Stage 3: Displacement stage, with the drive shaft 6 rotating and associated displacement of the high voltage movable main contact or contacts (as shown in FIG. 3C);

Stage 4: Run-off stage, i.e. the final part of the movement, in which the motor 3 is in rotation but the drive shaft 6 is at rest in the closed position "I" (as shown in FIG. 3D); and Stage 5: End of closed position "I" (shown in FIG. 3E).

The above stages of operation can take place in both directions, i.e. from "O" to "I", and from "I" to "O".

Stage 1: The lever 5 with its fork 50 is blocked by the end stop 9b and by the guide fingers 410. The control levers 80a and 80b and the auxiliary interrupter 7 are in the "O" position. The electric motor 3 is not energized. The lever 5 is blocked by the end stop 9b and by the guide fingers 410 in contact with the inclined edges 500c.

Stage 2: A voltage is applied to the electric motor 3, which therefore displaces the rider nut 41 on the worm shaft 40 towards the "I" position. The lever 5 is still blocked by the end stop 9b and guide finger 410, but the guide finger is now displaced along the inclined edges 500c. The drive shaft 6 is held stationary, and the high voltage contact that is fixed relative to the shaft 6 remains open. The nut 41 causes the control lever 80b to pivot towards an intermediate position. The control lever 80a therefore pivots at the same time in the same direction, due to the direct coupling provided by the first coupling bar 82. In the course of this Stage 2, the cursor 411 is displaced into the straight portion 802b and then into the curved portion 801b, and the control levers 80a and 80b turn in the clockwise direction. The auxiliary interrupter 7 is put into its intermediate position. The mechanical brake 11 is then released as is described below.

Stage 3: The cursor 411 has reached the straight portion 800b, and the guide fingers 410 have at the same time reached the straight slots 500a of the lever 5. The guide fingers 410 slide in the straight slot 500a of the forked lever 5. This lever is therefore rotated, and this also rotates the drive shaft 6. The high voltage movable main contact HV is then displaced towards the closed position. The control levers 80a and 80b remain in the intermediate position, that is to say with the guide edges 800a and 800b facing each other and aligned above the worm shaft 40, while the cursor 411 passes from the guide edge 800b of one of the levers, 80b, to the guide edge 800a of the other lever 80a. The auxiliary interrupter 7 remains in its intermediate position.

Stage 4: The lever 5, with its fork 50, is blocked by the end stop 9b and the guide fingers 410, which slide against the inclined edges 500b. The main high voltage contact HV, driven by the drive shaft 6, has reached its closed position. Over the same period of time, the cursor 411 enters the curved position 801a of the guide edge 800a, and the lever 80a is displaced towards the "I" position. The lever 80b turns in the same direction by virtue of the coupling made by the first coupling bar 82. The movable contacts of the first one of the auxiliary interrupters 7 are therefore displaced by the second coupling bar 83, and reach the "I" position. The power supply to the motor is thereby cut, and the mechanical brake 11 is actuated in a manner that is explained in detail below, so as to brake and check the rotation of the shaft 43 and therefore that of the gear drive 4 and motor 30. The cursor 411 is stopped in the guide edge 802a.

Stage 5: The motor 3 and the gear drive 4 are completely stopped. The final position has been reached. The lever 5, with its fork 50, is blocked by the end stop 9a and by the guide fingers 410, which are engaged with the inclined edges 500b. In this Stage 5, the cursor 411 is engaged in the straight portion 802a of the guide edge 800 close to the pivot pin 81a. During the engagement of the cursor 411 in the curved position 802a, the mechanical brake 11 is operated, and the auxiliary interrupter 7 is in the "I" position.

Guiding of the cursor 411 by at least one of the two control levers 80a and 80b is maintained during all of the stages 1, 2, 3, 4 and 5 of the operation. In addition, due to the coupling between the two levers 80a and 80b by the coupling bar 82, the position of the two levers 80a and 80b is always controlled by the position of the rider nut 41, which therefore controls the position of the high voltage movable contacts HV.

Figure 4:
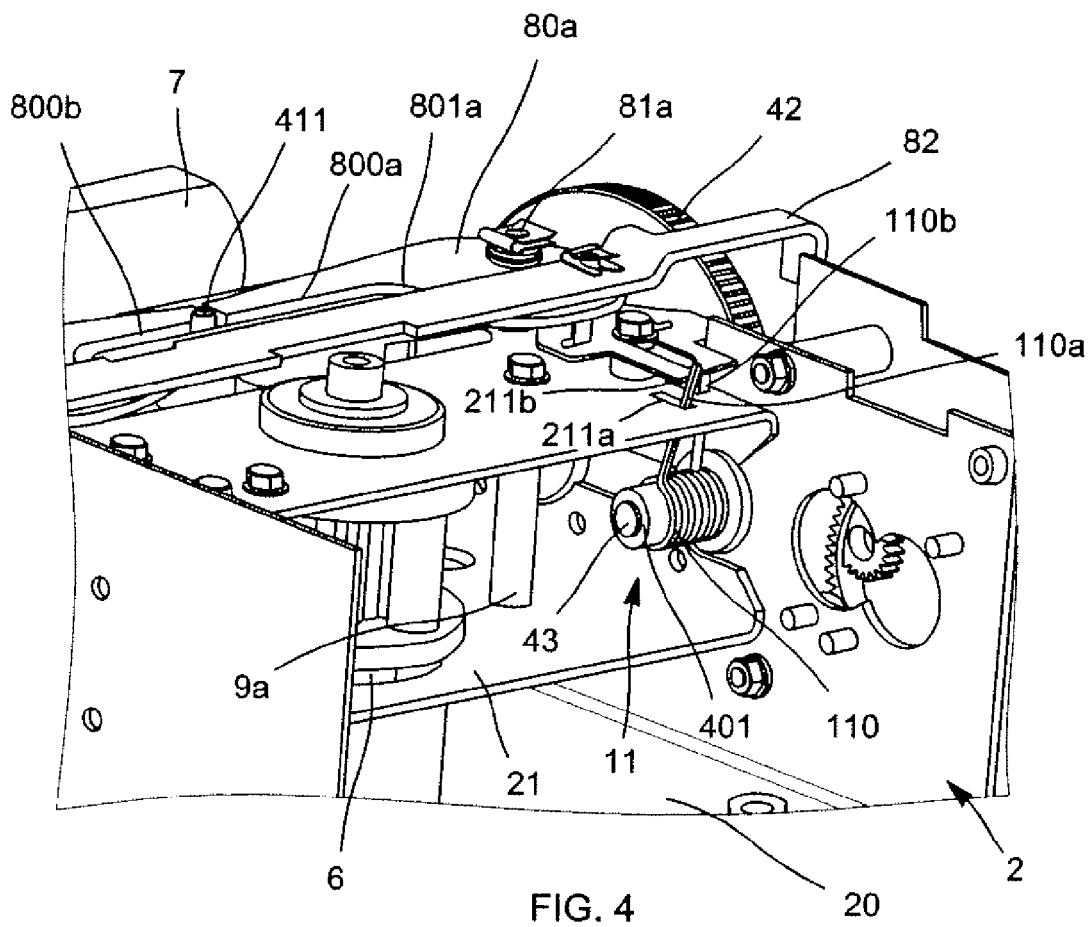
FIG. 4 is a partial view of an actuator 1, as in FIG. 1, and shows a mechanical brake in accordance with the invention in position.

As mentioned above, the actuator shown in the drawings includes a mechanical brake 11 which comprises a coil spring 110. The spring 110 acts on the shaft 43 around which it is fitted. The shaft 43 is one component of the gear drive 4, meshing through its pinion 130 directly with the toothed wheel 42. The braking torque generated by the brake 11 is smaller than the motor torque produced by the electric motor 3. Typically, the braking torque corresponds to a value the order of 10% of the motor torque. The brake 11 is in a braking condition so long as no outside force is applied on one of the ends, 110a, of the spring 110. The inside diameter of the turns of the spring 110 in its relaxed position is slightly smaller than the outside diameter of the shaft 43, or slightly smaller than that of an intermediate sleeve 431 which is fitted over the shaft 43 (see FIG. 4). Typically, the inside diameter of the coils 110 is 1% to 5% less than the outside diameter of the shaft 43 or than the diameter of the sleeve 431 fitted thereon. The support shaft 43 may thus consist of either a shaft which is monobloc, i.e. made in one piece, or an assembly of a shaft 43 with a sleeve 431, or a plurality of components, fitted over it.

In the embodiment shown, each of the ends 110*a* and 110*b* is guided in a slot 211*a*, 211*b* formed in the main support 21.

The main support 21 reacts to the braking force in such a way that the turns of the spring open up and cease to grip. The braking force is therefore determined by the force needed for opening the coiled spring 110. The coefficient of friction between the spring 110 and the shaft 43 or between the spring 110 and the sleeve 431 does not harm the braking force. That has the advantage that the braking force remains stable, and is not influenced by external conditions such as dust, frost, dew, or pollution . . . . The choice of material for shaft 43 or for sleeve 431 can advantageously be determined to obtain low friction. Fitting of the spring around the intermediate sleeve 431, and engagement of its ends 110*a* and 110*b* in the slots 211*a* and 211*b* of the support 21, make it possible to have a brake which does not engage by itself in the two directions of rotation of the shaft 43.

In an embodiment, the brake is not operated by the actuator 1 control means. The brake 11 therefore acts on the shaft 43 in a constant manner. This embodiment has the advantage of reducing the time needed for stopping the motor and the drive gear effectively with equipment that is simple and inexpensive.

In another embodiment, the brake is operated by the actuator 1 control means. It is thus actuated or released as a function of the operating stage of the actuator 1. This embodiment has the advantage of requiring less energy and of generating less wear of the brake through abrasion. Thus, in this other embodiment, in order to operate the brake 11, a slider 84 is provided, this slider being driven in straight line movement by the control lever 80*a*. Thus, in Stage 4 when the cursor 411 is reaching the end of its movement in the curved portion 801*a* of the guide edge, the rotating lever 80*a* displaces the slider 84 in the direction (b). One of the free ends 110*a* and 110*b* of the spring 110 bears on one of the slots 211*a* or 211*b*. As to which of the free ends this is, that depends on the direction in which the motor is rotating. In consequence, the spring 110 is open at one of its ends and the braking force is limited to the force for opening the spring 110.

Figure 5:
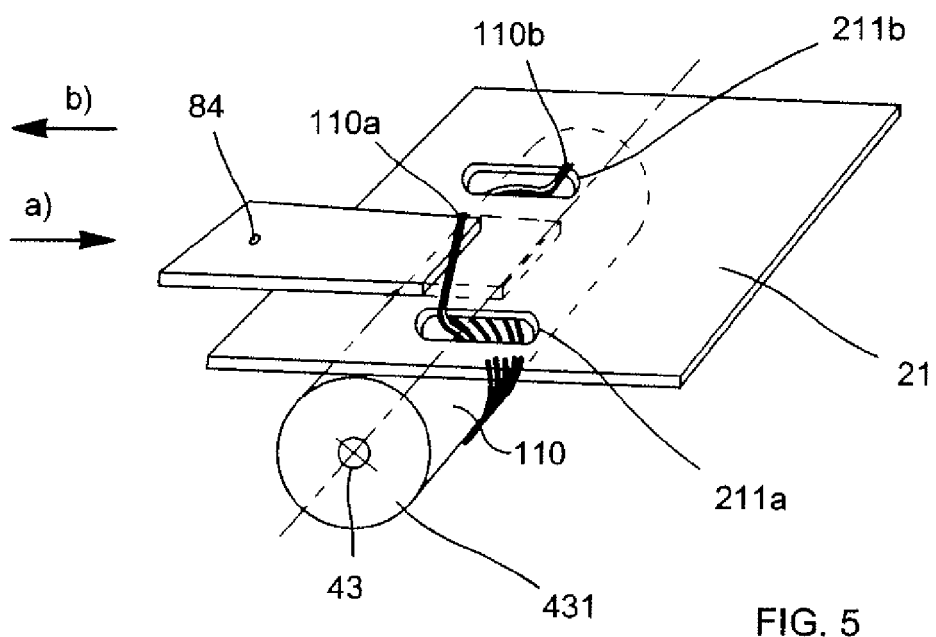
FIG. 5 is a diagrammatic view of a mechanical brake in accordance with the invention.

In order to release the brake 11 in Stage 2, when the cursor is being displaced in the guide edge 801*a* towards the edge 800*a*, the slider 84 is displaced in the direction (a), which is opposite to direction (b), and engages on the free end 110*a* of the spring 110, to displace it in the slot 211*a* formed in the support in which the end 110*a* is lodged. The other free end 110*b* is held stationary in another slot 211*b*, which is also formed in the support 21 and which is parallel with the slot 211*a*. The diameter of the turns of the spring 110 expands accordingly, and the mechanical brake 11 is released. The displacement of the slider 84 in straight line movement is controlled by the rotation of the control lever 80*a* (see FIG. 5).

The coupling between the two levers 80*a* and 80*b* by the coupling bar 82, and the coupling between the slider 84 and lever 80*a* are such that:

the slider 84 is displaced in direction (b), and the brake is activated if the cursor 411 is approaching one of the two final positions and is in one of the curved guide edges 801*a* or 801*b*, that is to say beyond the two predetermined positions of the drive shaft 6; and the slider 84 is displaced in direction (a), opposite to direction (b), and the brake is released if the cursor 411 is on one of the straight guide edges 800*a* or 800*b*, that is to say between the two predetermined positions of the drive shaft 6.

The actuator 1 in the embodiment shown includes a second auxiliary interrupter 10. The movable contact of the second auxiliary interrupter 10 is coupled to the movable contact of the first auxiliary interrupter 7 through a third coupling bar 100. Thus, displacement of the movable contact of the interrupter 7 causes simultaneous displacement of the movable contact of the auxiliary interrupter 10.

Figure 3A:
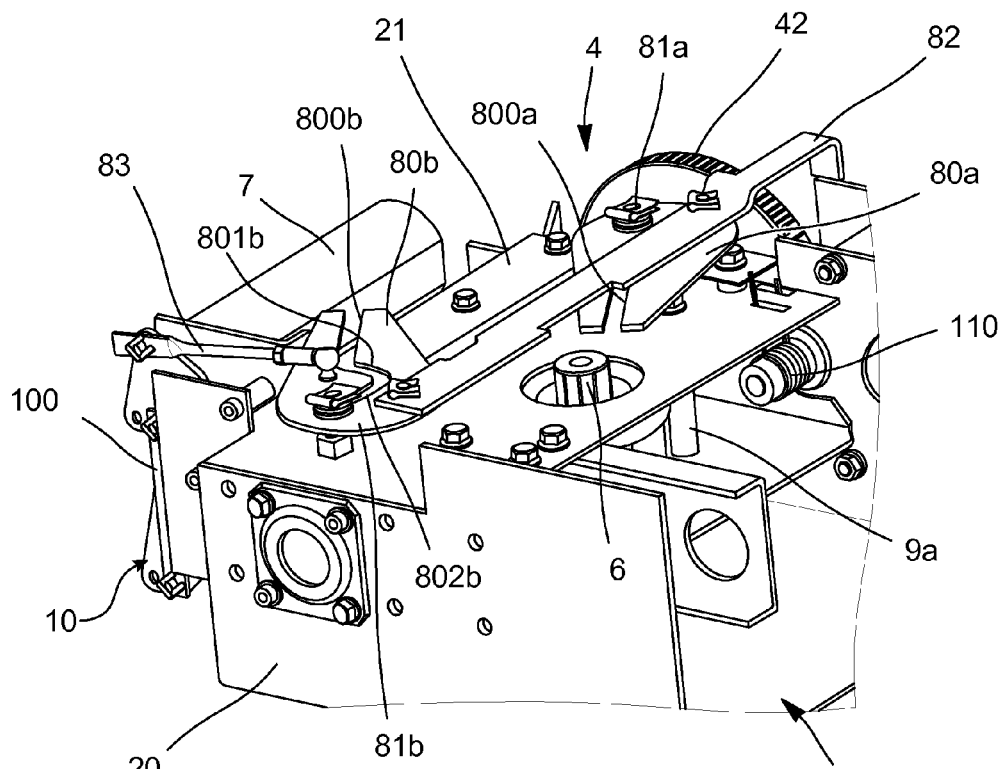
FIGS. 3A to 3E are partial views showing the various consecutive steps in the operation of the actuator shown in FIG. 1.
Figure 3B:
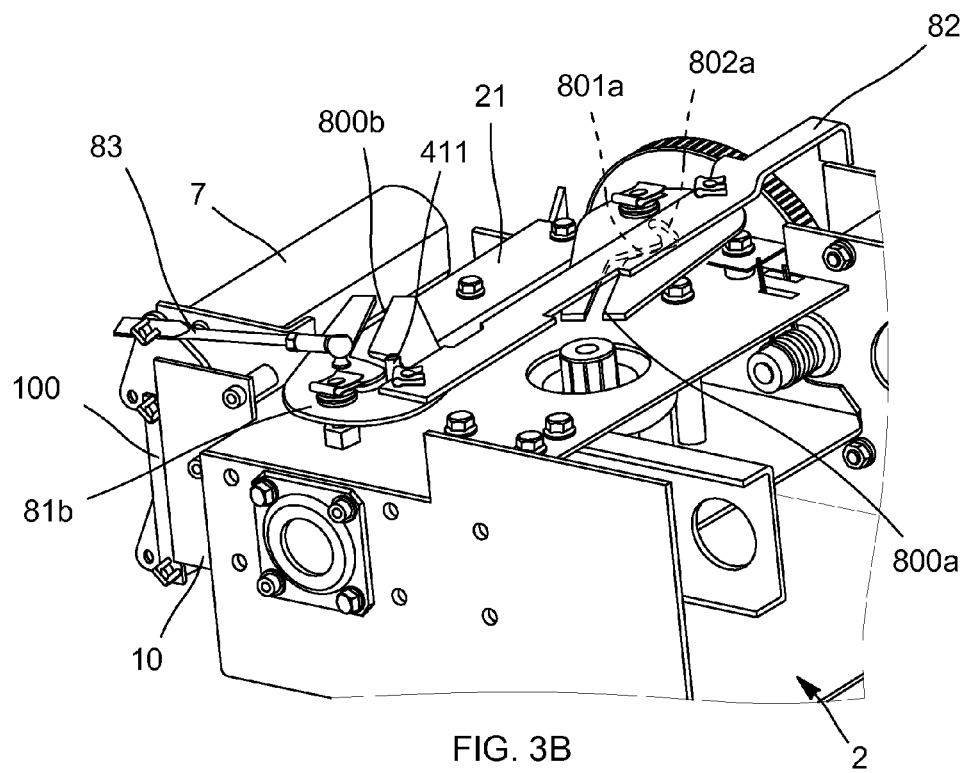
Figure 3C:
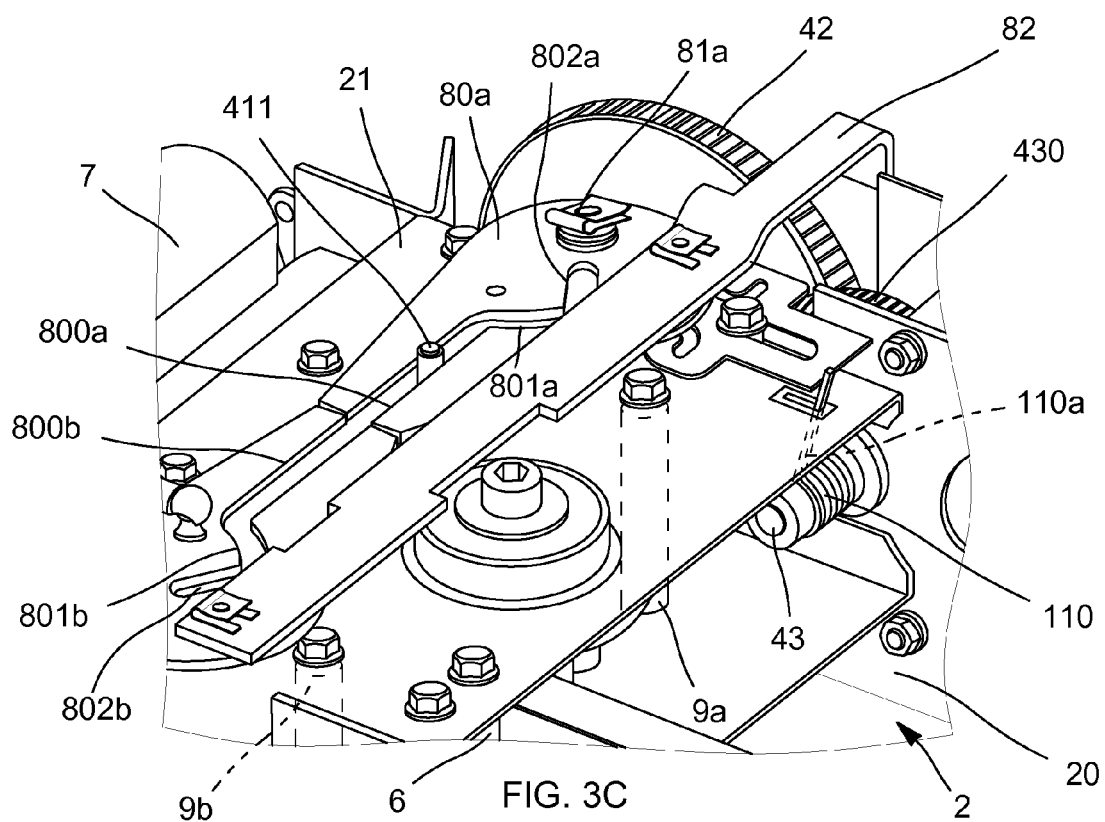
Figure 3D:
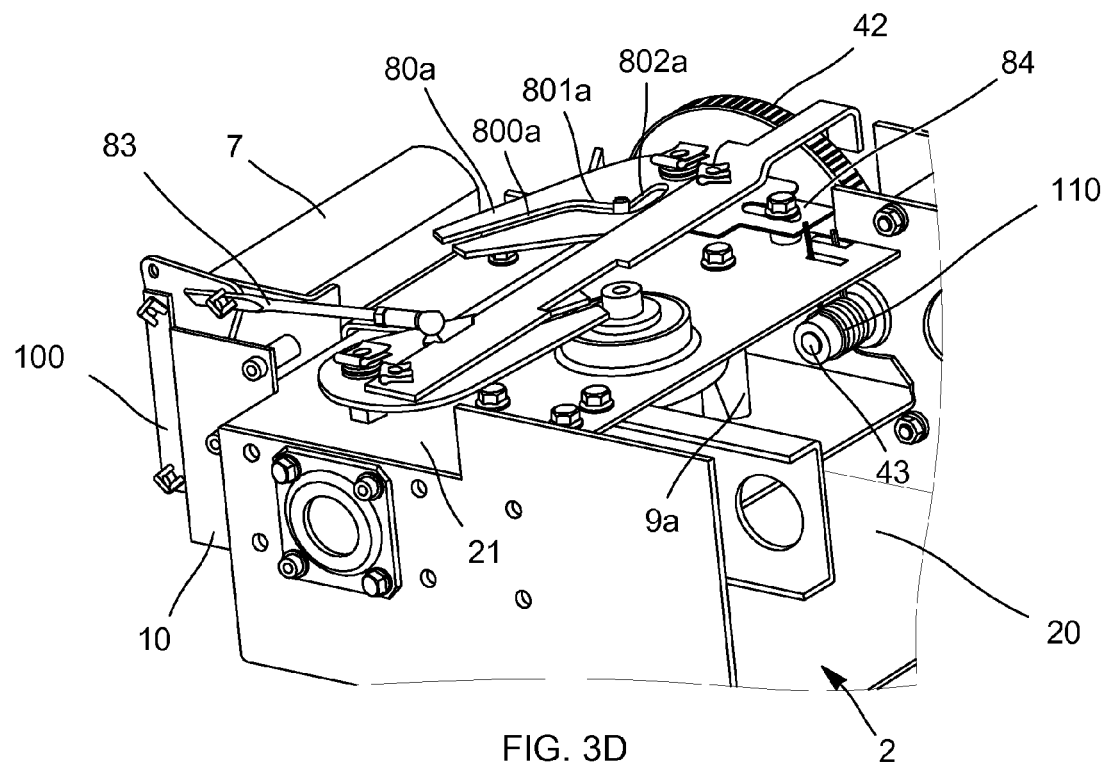
Figure 3E:
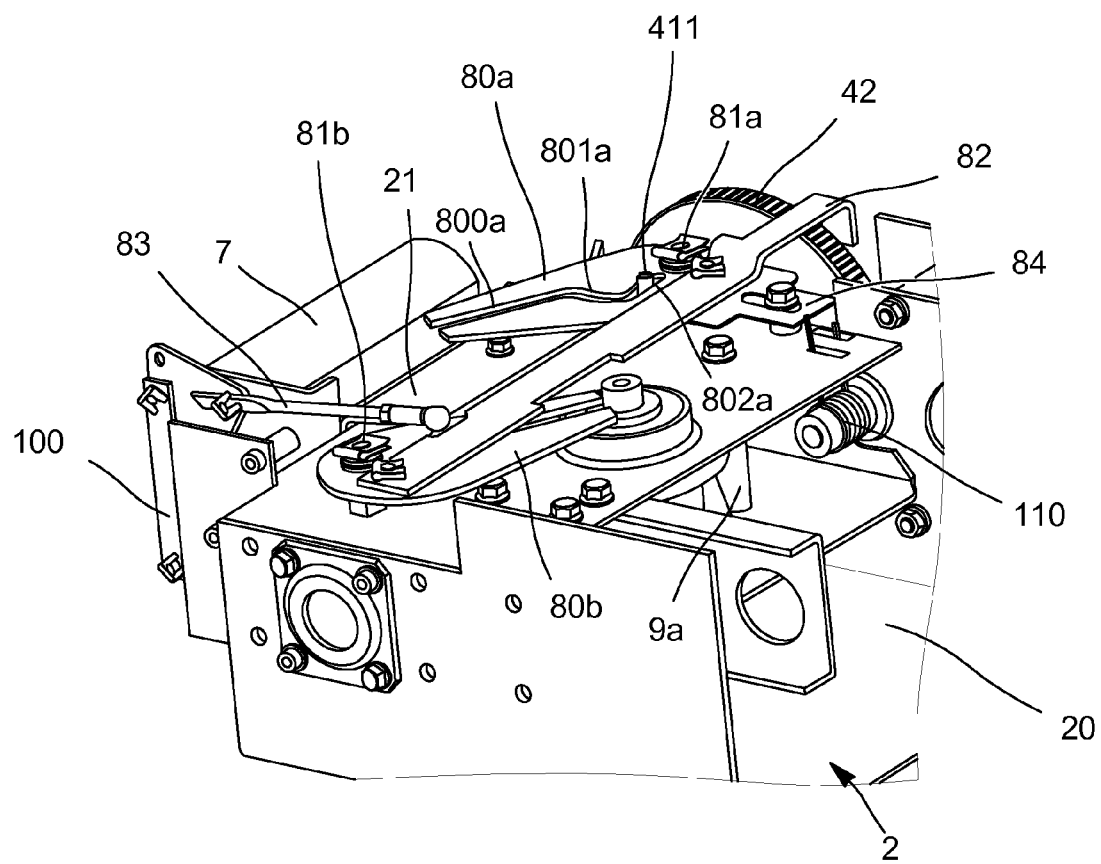

More precisely, where the apparatus having the actuator 1 of the invention is a high or medium voltage disconnector, the auxiliary interrupter 10 indicates that the disconnector is in the "O" switching state until the cursor 411 reaches the curved portion 801*b* of the pivoting lever 80*b* (see FIGS. 3A and 3B). Just before the cursor 411 reaches the straight portion 800*b*, the movable contact of the auxiliary interrupter is deflected into the "intermediate" switching state, and stays in that position while the cursor 411 is moved into the straight portions 800*b* and 800*a* (see FIG. 3C). When the cursor 411 reaches the curved zone 801*a*, the movable contact of the auxiliary interrupter 10 is deflected simultaneously with the movable contact of the auxiliary interrupter 7, and indicates accordingly the "I" switching state of the disconnector (see FIG. 3D).

The second straight portion 802*a*, 802*b* of the guide edges is continuous with the curved portion 801*a* or 801*b*. The length of this second straight portion 802*a* or 802*b* enables the cursor 411 sliding within it to stop without the levers 80*a* and 80*b* pivoting, once the power to the electric motor has been switched off by the auxiliary interrupter 7 in its switching position (see FIG. 3E).

The actuator which has just been described is particularly suitable for the control of high or medium voltage disconnectors: the rotating drive shaft 6 may operate high voltage or medium voltage movable main contacts HV or MV.

The invention claimed is:

1. An actuator of an electro-mechanical type comprising:
   a frame;
   an electric motor fixed to the frame;
   a gear drive for transmitting motion from the motor to a drive shaft such that the drive shaft can rotate between two predetermined positions, the gear drive and the drive shaft also being fixed to the frame; and
   a brake for braking the drive shaft, the brake consisting of a coil spring having turns and two free ends, having, when relaxed, an inside diameter that is smaller than an outside diameter of a support shaft that is fixed relative to the gear drive, and around which the spring is coiled, each of the two free ends of the coil spring being arranged in a respective slot formed in the said frame transversely to the support shaft, the arrangement of each of the two free ends of the coil spring being such that only one end comes into transverse engagement against an edge of the slot, while the other end is free in the slot in the transverse direction,
   wherein the brake has a braking force limited to an opening force needed for opening the turns of the spring and is controlled as a function of the position of the drive shaft in such a way as to be:
   activated after the drive shaft has reached a position corresponding to the power supply to the motor being broken; and
   released when the drive shaft is in a position between the two said predetermined positions.

2. An actuator according to claim 1, wherein the mechanical brake is actuated by transverse displacement in one direction of a member which is itself displaced by the gear drive so as to put the one end into transverse engagement against the edge of the slot while leaving the other end free in the slot in the transverse direction.

3. An actuator according to claim 1, wherein the mechanical brake is disabled between the two predetermined positions of the drive shaft, the brake being disabled by transverse displacement of the said member in a direction opposite to one direction, so as to exert a thrust transversely on at least the free end of the coil spring, to put said free end into transverse engagement against the edge of said slot by fully opening turns of the spring around the support shaft.

* * * * *